US012628022B2

(12) United States Patent
Li et al.

(10) Patent No.: US 12,628,022 B2
(45) Date of Patent: May 12, 2026

(54) SYSTEMS, METHODS, AND DEVICES FOR ENHANCED MEASUREMENT GAP SHARING AND MEASUREMENT GAP PATTERNS

(71) Applicant: Apple Inc., Cupertino, CA (US)

(72) Inventors: Qiming Li, Beijing (CN); Xiang Chen, Campbell, CA (US); Dawei Zhang, Saratoga, CA (US); Yang Tang, San Jose, CA (US); Jie Cui, San Jose, CA (US); Rolando E Bettancourt Ortega, Munich (DE); Manasa Raghavan, Sunnyvale, CA (US); Yuexia Song, Beijing (CN)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 18/366,069

(22) Filed: Aug. 7, 2023

(65) Prior Publication Data

US 2024/0056864 A1      Feb. 15, 2024

Related U.S. Application Data

(60) Provisional application No. 63/396,660, filed on Aug. 10, 2022.

(51) Int. Cl.
*H04W 24/10* (2009.01)
(52) U.S. Cl.
CPC .................................... *H04W 24/10* (2013.01)

(58) Field of Classification Search
CPC ............................... H04W 24/10; H04L 12/28
USPC ................................. 370/329, 401, 402, 403
See application file for complete search history.

(56) References Cited

U.S. PATENT DOCUMENTS

2024/0147288 A1*   5/2024   Huang ................... H04B 17/24

OTHER PUBLICATIONS

5G; NR; Requirements for support of radio resource management;(3GPP TS 38.133 version 17.5.0 Release 17); ETSI TS 138 133 V17.5.0; May 2022.

* cited by examiner

*Primary Examiner* — Dang T Ton
(74) *Attorney, Agent, or Firm* — Eschweiler & Potashnik, LLC; Matthew Glause

(57) ABSTRACT

The techniques described herein provide enhanced measurement gap sharing solutions that enable measurement gap sharing for layer 1 (L1) measurements for serving and non-serving cells, and for layer 3 (L3) measurements for intra-frequency measurements and inter-frequency/inter-radio access technology (RAT) measurements. Also provided are solutions for measurement gap sharing among intra-frequency L1 and L3 measurements and inter-frequency L1 and L3 measurements. Measurement gap patterns for L1 and L3 measurements are also provided, as well as solutions for further splitting L1 measurement gap sharing among different types of L1 operations.

20 Claims, 14 Drawing Sheets

GAP SHARING: L1 SERVING AND NON-SERVING CELL MEASUREMENTS AND L3 INTRA-
FREQUENCY AND INTER-FREQUENCY/INTER-RAT MEASUREMENTS

| GAP SHARING | L1 (X1) | | L3 (X2) | |
|---|---|---|---|---|
| | SERVING CELL MEASUREMENT | NON-SERVING CELL MEASUREMENT | INTRA-FREQUENCY MEASUREMENT | INTER-FREQUENCY/INTER-RAT MEASUREMENT |
| (%) | Y1 | Y2 | Z1 | Z2 |
| NOTE | $X1 + X2 = 100\%$ $Y1 + Y2 = X1$ $Z1 + Z2 = X2$ | | | |

GAP SHARING BETWEEN INTRA-FREQUENCY AND INTER-FREQUENCY/INTER-RAT L1
AND L3 MEASUREMENTS

| GAP SHARING | INTRA-FREQUENCY (X1) | | INTER-FREQUENCY/INTER-RAT (X2) | |
|---|---|---|---|---|
| | L1 | L3 | L1 | L3 |
| (%) | Y1 | Y2 | Z1 | Z2 |
| NOTE | X1 + X2 = 100%<br>Y1 + Y2 = X1<br>Z1 + Z2 = X2 | | | |

FIG. 6

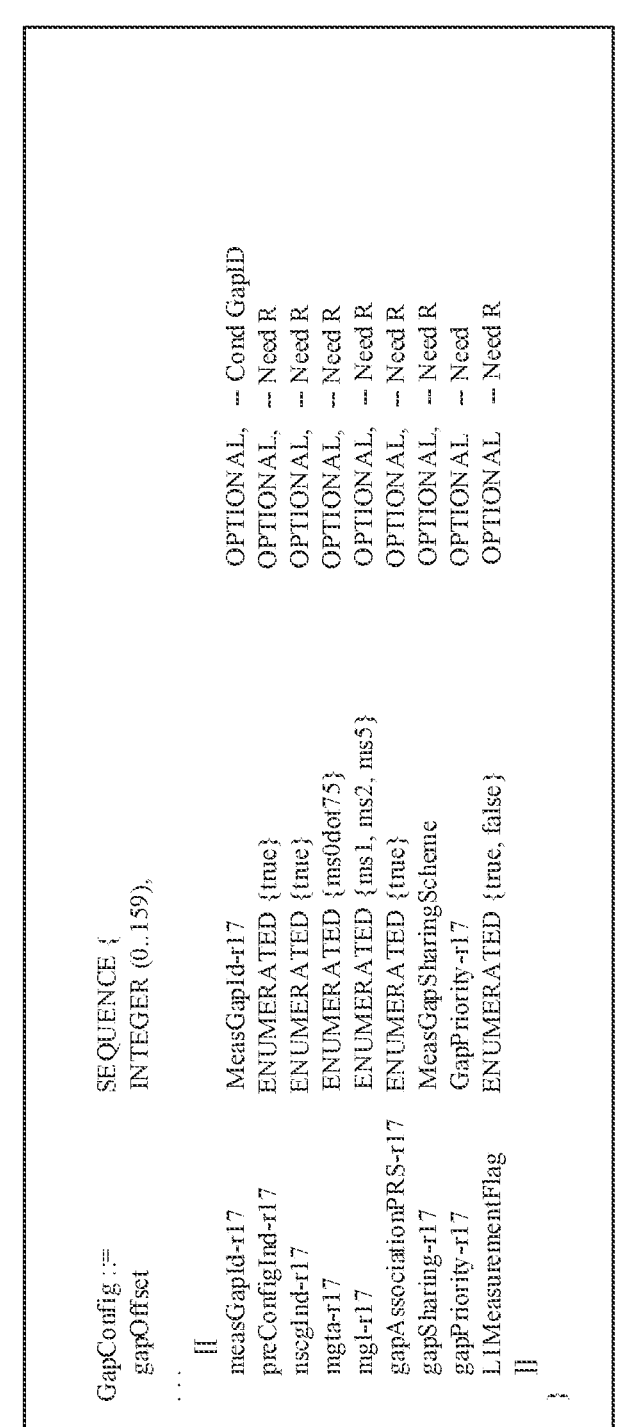

```
GapConfig ::=            SEQUENCE {
    gapOffset            INTEGER (0..159),
    ...
    measGapId-r17        MeasGapId-r17                            OPTIONAL,   -- Cond GapID
    preConfigInd-r17     ENUMERATED {true}                       OPTIONAL,   -- Need R
    nscgInd-r17          ENUMERATED {true}                       OPTIONAL,   -- Need R
    mgta-r17             ENUMERATED {ms0dot75}                   OPTIONAL,   -- Need R
    mgl-r17              ENUMERATED {ms1, ms2, ms5}              OPTIONAL,   -- Need R
    gapAssociationPRS-r17 ENUMERATED {true}                      OPTIONAL,   -- Need R
    gapSharing-r17       MeasGapSharingScheme                    OPTIONAL,   -- Need R
    gapPriority-r17      GapPriority-r17                         OPTIONAL,   -- Need
    L1MeasurementFlag    ENUMERATED {true, false}                OPTIONAL    -- Need R
}
```

| measGapSharingSchemeL1 | PERCENTAGE |
|---|---|
| RLM | X |
| BFD | Y |
| L1 RSRP/SNR MEASUREMENT | Z |

Note 1: UE may determine which measurement gap sharing scheme is to be applied when MeasGapSharingSchemeL1 is absent and there is no stored value in the field.

Note 2: X + Y + Z = 100%

*FIG. 11*

SYSTEMS, METHODS, AND DEVICES FOR ENHANCED MEASUREMENT GAP SHARING AND MEASUREMENT GAP PATTERNS

REFERENCE TO RELATED APPLICATIONS

This application claims the benefit of U.S. Provisional Patent Application No. 63/396,660 filed on Aug. 10, 2022, entitled "SYSTEMS, METHODS, AND DEVICES FOR ENHANCED MEASUREMENT GAP SHARING AND MEASUREMENT GAP PATTERNS", the contents of which are herein incorporated by reference in their entirety.

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology may include solutions for enabling user equipment (UE) to communicate with wireless network (e.g., a base station), including evaluating the signals and transmissions between the UE and the network.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 4 is a diagram of an example for measurement gap sharing for layer 1 (L1) serving and non-serving cell measurements and layer 3 (L3) intra-frequency and inter-frequency/inter-radio access technology (RAT) measurements according to one or more implementations described herein.

FIG. 6 is a diagram of an example for measurement gap sharing between L1 and L3 intra-frequency and inter-frequency/inter-RAT measurements according to one or more implementations described herein.

FIG. 10 is a diagram of an example of an enhanced radio resource control (RRC) message and/or information element (IE) for associating L1 measurements with a measurement gap of a measurement gap pattern according to one or more implementations described herein.

FIG. 11 is a diagram of an example of measurement gap sharing among L1 operations according to one or more implementations described herein.

DETAILED DESCRIPTION

Figure 1:
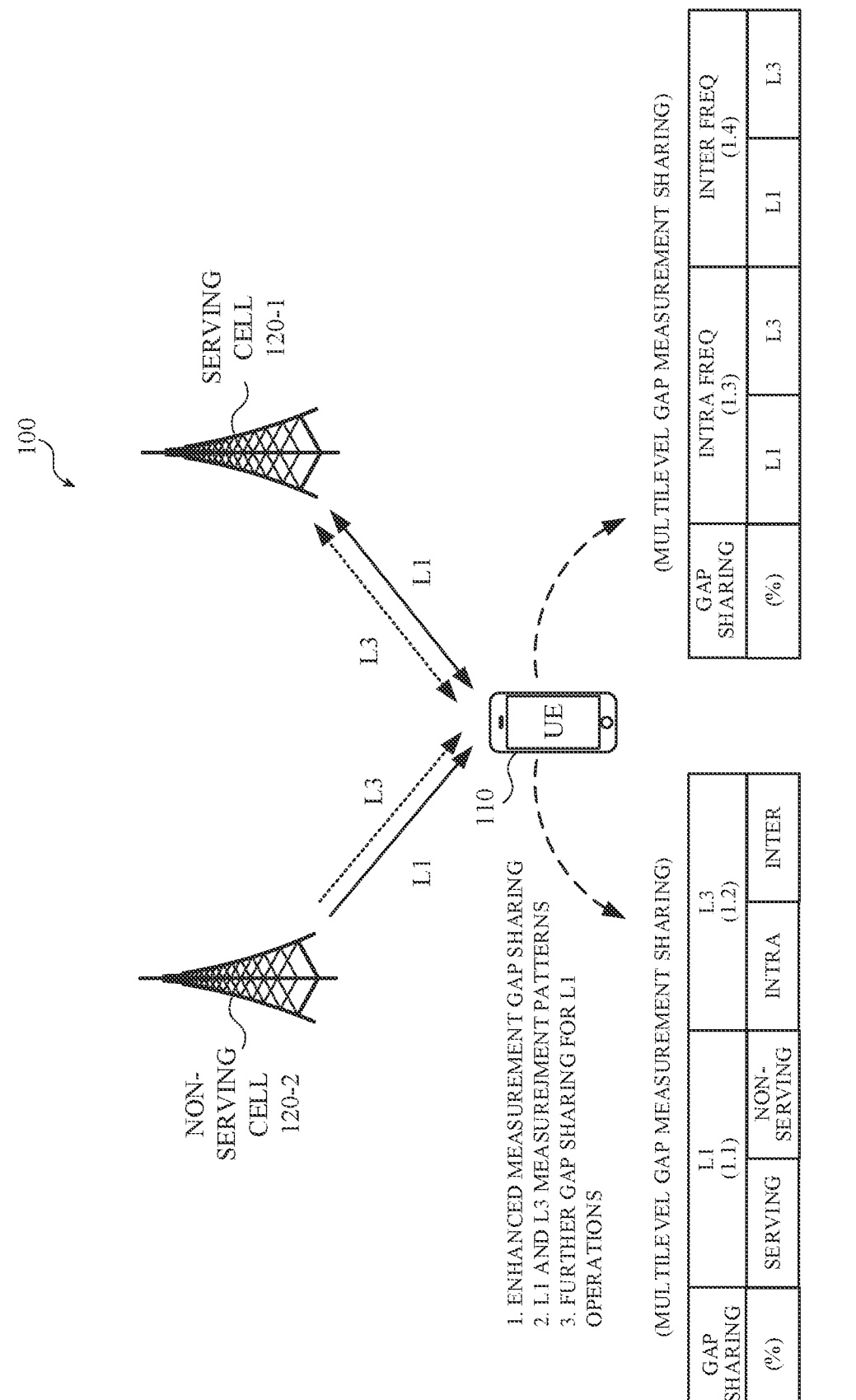
FIG. 1 is a diagram of an example overview according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless networks may include user equipment (UEs) capable of communicating with base stations, wireless routers, satellites, and other network nodes. Such devices may operate in accordance with one or more communication standards, such as 2nd generation (2G), 3rd generation (3G), 4th generation (4G) (e.g., long-term evolution (LTE)), and/or or 5th generation (5G) (e.g., new radio (NR)) communication standards of the 3rd generation partnership project (3GPP). An important aspect of such technologies involves enabling UEs to measure and report the quality of signals received from the network.

Measurement gaps are opportunities for UEs to perform measurements on downlink (DL) signals. A UE may not be able to perform inter-frequency or inter-radio access technology (RAT) measurements while also transmitting or receiving wireless signals. Even for intra-frequency measurements, a UE may use measurement gaps when measurements are to be performed outside the UE's currently active bandwidth part (BWP). Measurement gaps may be configured by network via a measurement gap configuration and may be indicated by parameters such as a measurement gap repetition period (MGRP), a gap offset, a measurement gap length (MGL), a measurement gap timing advance (MGTA), a reference serving cell indicator, and more.

At times, the network may use L3 signaling (e.g., via radio resource control (RRC) messaging) to configure the UE to measure different DL signals using overlapping measurement gaps, which is also referred to as measurement gap sharing. The configuration may include instructions for how much of a shared measurement gap should be used to measure each signal. For example, the network may send the UE an RRC information element (IE) MeasGapSharing-Scheme. The IE includes a two-bit value (e.g., 00, 01, 10, and 11) indicating the value of X that corresponds to a percentage value that may be applied to carrier-specific scaling factors, $K_{intra}=1/X*100$; and $K_{inter}=1/(100–X)*100$, for measurement gap sharing purposes between intra-frequency L3 measurements and inter-frequency/inter-RAT L3 measurements. While currently available solutions for measurement gap sharing may be useful to some extent, they include one or more deficiencies. For example, currently available gap sharing solutions are limited to intra-frequency L3 measurements and inter-frequency/inter-RAT L3 scenarios.

The techniques described herein provide enhanced measurement gap sharing solutions that enable measurement gap sharing for layer 1 (L1 or physical layer) measurements for serving and non-serving cells, and for L3 measurements for intra-frequency measurements and inter-frequency/inter-RAT measurements. Also provided are solutions for measurement gap sharing among intra-frequency L1 and L3 measurements and inter-frequency L1 and L3 measurements. Measurement gap patterns for L1 and L3 measurements are also provided, as well as solutions for further splitting L1 measurement gap sharing among different types of L1 operations (e.g., radio link monitoring (RLM), beam failure discovery (BFD), candidate beam discovery (CBD), and L1 reference signal received power (RSRP)/signal-to-interference-plus-noise ratio (SINR) measurements). Accordingly, the techniques described herein provide several measurement gap sharing solutions not addressed or contemplated by currently available measurement gap sharing solutions. Additional features and details are described below with reference to the Figures that follow.

An L1 measurement, as described herein, may include a DL signal that is measured and/or reported upon by a UE directly at the L1 or physical layer. An L1 operation, as described herein, may include a process or operation, performed by a UE, at the physical layer. Examples of an L1 operation may include a RLM, BFD, CBD, or L1-RSRP/L1-SINR operation. An L3 measurement, as described herein, may include a DL signal that may be measured at the L1 level, but is evaluated and responded to, at the L3 or RRC layer. An L3 operation, as described herein, may include an operation, performed by a UE, at the L3 or RRC layer. Examples of an L3 operation may include operations handled at the L3 or RRC layer, such as evaluating whether a signal condition (measured at the physical layer) is to be reported to a base station. Intra-frequency signals or measurements, as described herein, may refer to signals (e.g., transmit and receive signals) or the measurement of signals that use the same frequency, frequency band, numerology, and frequency range (e.g., frequency range 1 (FR1) or FR2). Inter-frequency signals or measurements, as described herein, may refer to signals (e.g., transmit and receive signals) or the measurement of signals that use different frequencies, frequency bands, numerology, or frequency ranges. Inter-RAT signals or measurements, as described herein, may refer to signals (e.g., transmit and receive signals) or the measurement of signals that corresponding to different RATs.

FIG. 1 is a diagram of an example overview 100 according to one or more implementations described herein. As shown, overview 100 may include UE 110, serving cell 120-1, and non-serving cell 120-2. Serving cell 120-1 may configure UE 110 for enhanced measurement gap sharing, which may include a multilevel measurement gap sharing scheme.

In some implementations, a first level of the multilevel measurement gap sharing scheme may be divided between L1 and L3 measurements, as shown in 1.1 and 1.2. LI measurements may be subdivided (e.g., shared) between serving cell measurements and non-serving cell measurements. L1 measurements may include one or more of RLM, BFD, CBD, or RSRP/SINR measurements. L3 measurements may be subdivided (e.g., divided between intra-frequency and inter-frequency/inter-RAT measurements). In another example implementation, as shown in 1.3 and 1.4, the first level of the multilevel measurement gap sharing scheme may be divided between intra-frequency measurements and inter-frequency/inter-RAT measurements. Intra-frequency measurements may be subdivided (e.g., shared) between L1 and L3 measurements, and inter-frequency/inter-RAT measurements may also be subdivided between L1 and L3 measurements.

In some implementations, serving cell 120-1 may configure UE 110 with a measurement gap pattern that includes a sequence of shared measurement gaps. In such implementations, serving cell 120-1 may also indicate which measurement gaps are for L1 measurements and which gaps are for L3 measurements. In some implementations, the multilevel measurement gap sharing scheme implemented by UE 110, serving cell 120-1, and non-serving cell 120-2 may include an additional layer of measurement gap sharing (not shown) that may further divide types of L1 measurements (e.g., RLM, BFD, CBD, or RSRP/SINR measurements) into sub-portions or percentages of the L1 measurements. Accordingly, the techniques described herein provide several enhancements to currently available measurement gap sharing practices, and additional features and details of these techniques are described below with reference to the Figures below.

Figure 2:
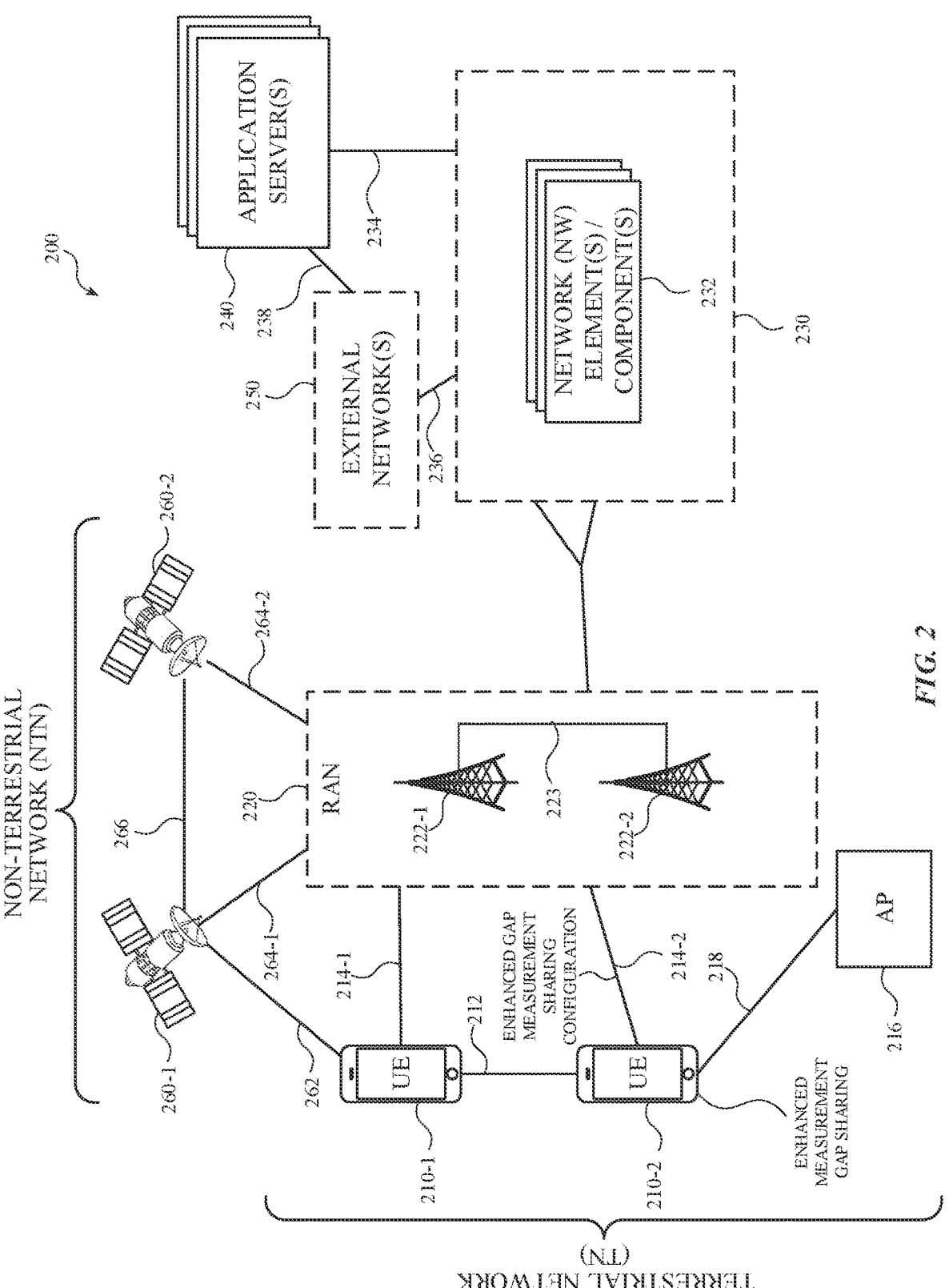
FIG. 2 is a diagram of an example network according to one or more implementations described herein.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, external networks 250, and satellites 260-1, 260-2, etc. (referred to collectively as "satellites 260" and individually as "satellite 260"). As shown, network 200 may include a non-terrestrial network (NTN) comprising one or more satellites 260 (e.g., of a global navigation satellite system (GNSS)) in communication with UEs 210 and RAN 220.

The systems and devices of example network 200 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via one or more wireless channels 212, each of which may comprise a physical communications interface/layer. The connection may include an M2M connection, MTC connection, D2D connection, etc. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may communicate and establish a connection with (e.g., be communicatively coupled) with RAN 220, which may involve one or more wireless channels 214-1 and 214-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 210, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 222.

As described herein, UE 110 may receive an enhanced measurement gap sharing configuration from RAN node 222. The measurement gap sharing configuration may enable UE 110 to share a measurement gap to take L1 serving cell measurements, L1 non-serving cell measurements, and L3 intra-frequency and inter-frequency/inter-RAT measurements. Additionally, or alternatively, the measurement gap sharing configuration may enable UE 110 to share a measurement gap to take intra-frequency L1 and L3 measurements, and inter-frequency/inter-RAT L1 and L3 measurements. The measurement gap sharing configuration may further enable UE 110 to implement a measurement gap pattern for L1 and L3 measurements and allocate L1 portions of a shared measurement gap among specific types of L1 operations (e.g., RLM, BFD, etc.).

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection to AP 216 may comprise a local wireless connection, such as a connection consistent with any IEEE 702.11 protocol, and AP 216 may comprise a wireless fidelity (Wi-Fi®) router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

RAN 220 may include one or more base stations 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells. As described below, in some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and to implementation where the base station, RAN node 222, etc., is a non-terrestrial network node (e.g., satellite 260).

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CN 230 (e.g., universal mobile telecommunications system packet services (UMTS PS) domain, LTE PS data services, etc.). Application servers 240 may also, or alternatively, be configured to support one or more communication services (e.g., voice over IP (VoIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

As shown, example network 200 may include an NTN that may comprise one or more satellites 260-1 and 260-2 (collectively, "satellites 260"). Satellites 260 may be in communication with UEs 210 via service link or wireless interface 262 and/or RAN 220 via feeder links or wireless interfaces 264 (depicted individually as 264-1 and 264-2). In some implementations, satellite 260 may operate as a passive or transparent network relay node regarding communications between UE 210 and the terrestrial network (e.g., RAN 220). In some implementations, satellite 260 may operate as an active or regenerative network node such that satellite 260 may operate as a base station to UEs 210 (e.g., as a gNB of RAN 220) regarding communications between UE 210 and RAN 220. In some implementations, satellites 260 may communicate with one another via a direct wireless interface 266 or an indirect wireless interface (e.g., via RAN 220 using interfaces 264-1 and 264-2).

Additionally, or alternatively, satellite 260 may include a GEO satellite, LEO satellite, or another type of satellite. Satellite 260 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and implementation, where the base station, RAN node 222, etc., is a non-terrestrial network node (e.g., satellite 260). As described herein, UE 210 and RAN node 222 may communicate with one another via interfaces to enable enhanced power saving techniques.

Figure 3:
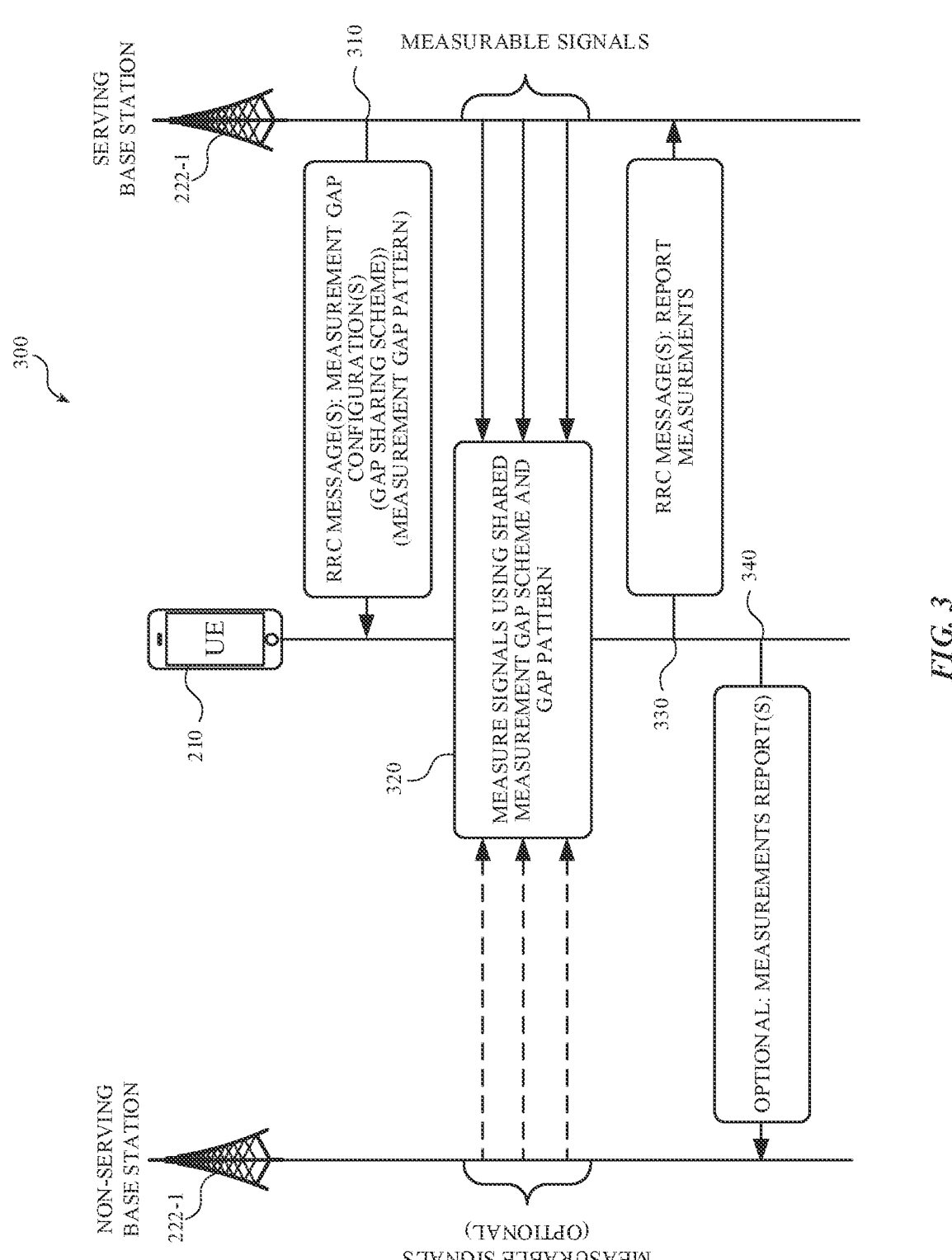
FIG. 3 is a diagram of an example process for enhanced measurement gap sharing according to one or more implementations described herein.

FIG. 3 is a diagram of an example process 300 for enhanced measurement gap sharing according to one or more implementations described herein. Process 300 may be implemented by UE 210, serving base station 222-1, and non-serving base station 222-2. In some implementations, some or all of process 300 may be performed by one or more other systems or devices, including one or more of the devices of FIG. 2. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3.

Serving base station 222-1 may determine an appropriate measurement gap configuration for UE 210 and provide UE 210 with the configuration (block 310). The measurement gap configurations may be sent in one or more RRC messages and may include information about overlapping measurement gaps that UE 210 is to use for measurement gap sharing. As shown, the information may include a MeasGap-SharingScheme IE, and/or one or more other types of IEs, that may indicate how much of a shared or overlapping measurement gap UE 210 is to use for different types of measurements. In some implementations, serving base station 222-1 may also, or alternatively, provide UE 210 with a measurement gap pattern. As described herein, this may include an indication of which gaps of the gap pattern are for L1 measurements and which are for L3 measurements.

In some implementations, UE 210 may be configured to share a measurement gap to take L1 serving cell measurements, L1 non-serving cell measurements, and L3 intra-frequency and inter-frequency/inter-RAT measurements. Additionally, or alternatively, UE 210 may be configured to share a measurement gap to take intra-frequency L1 and L3 measurements, and inter-frequency/inter-RAT L1 and L3 measurements. The measurement gap sharing configuration may further enable UE 110 to implement a measurement gap pattern for L1 and L3 measurements and allocate L1 portions of a shared measurement gap among specific types of L1 operations (e.g., RLM, BFD, etc.). Accordingly, the techniques described herein provide several enhancements to currently available measurement gap sharing practices, and additional features and details of these techniques are described below with reference to the Figures below.

As shown, UE 210 may measure signals (e.g., L1, L3, intra-frequency, inter-frequency/inter-RAT signals, etc.) from serving base station 222-1 and/or non-serving base station 222-2 (block 320). For example, as UE 210 becomes closer to a handover scenario involving non-serving base station 222-2, UE 210 may be configured to, and may measure, signals from non-serving base station 222-2 according to the measurement configuration information received from serving base station 222-1. UE 210 may also send or report the results of measurements to serving base station 222-1 (block 330). In some implementations, UE 210 may also, or alternatively, send or report the results of measurements to non-serving base station 222-1 (block 340). For example, when measured signals from non-serving base station 222-1 support a handover situation, UE 210 may provide non-serving base station 222-1 with one or more measurement reports.

FIG. 4 is a diagram of an example 400 for measurement gap sharing for L1 serving and non-serving cell measurements and L3 intra-frequency and inter-frequency/inter-RAT measurements according to one or more implementations described herein. Example 400 may represent possible configurations that base station 222 may provide to UE 210 for measurement gap sharing. Variables X1 and X2 may correspond to L1 and L3, respectively. Together, X1 and X2 may represent 100% (e.g., an entirety) of a shared measurement gap, with X1 and X2 representing 50% each. X1 may comprise variables Y1 and Y2. Y1 may represent a portion of X1 allocated to serving cell measurements (e.g., L1 measurements of a serving cell). Y2 may represent a portion of X1 allocated to non-serving cell measurements (e.g., L1 measurements of a non-serving cell). Thus, Y1 plus Y2 may equal X1.

X2 may comprise variables Z1 and Z2. Z1 may represent a portion of X2 allocated to intra-frequency measurements (e.g., L3 measurements of intra-frequency signals). Z2 may represent a portion of X2 allocated to inter-frequency/inter-RAT measurements (e.g., L3 measurements of inter-frequency/inter-RAT signals). Thus, Z1 plus Z2 may equal X2. In some implementations, the values of X1, X2, Y1, Y2, Z1, and Z2 may vary. For example, X1 may be 25% and X2 may be 75% of the shared measurement gap. Similarly, Y1 and Y2 may, or may not, be 50% of the amount of the shared measurement gap allocated to X1, and Z1 and Z2 may, or may not, be 50% of the amount of the shared measurement gap allocated to Z1 and Z2.

Figure 5:
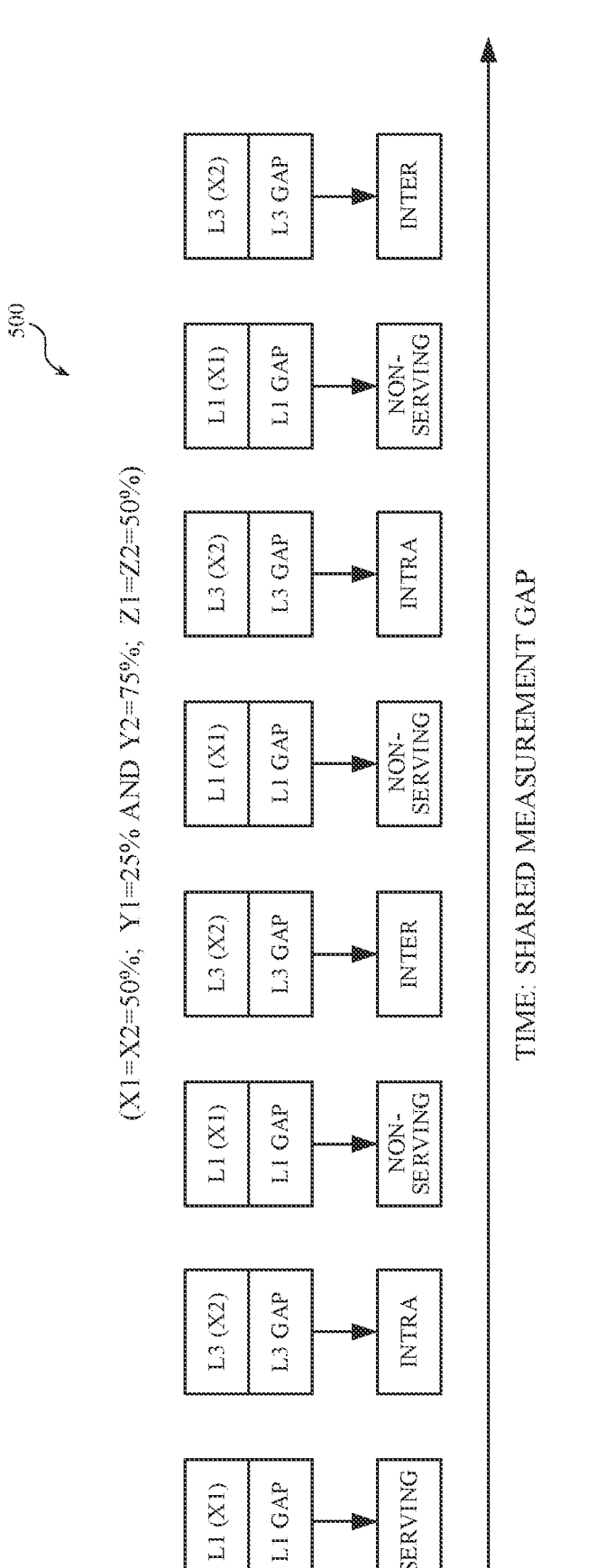
FIG. 5 is a diagram of an example of a measurement gap divided between L1 serving and non-serving cell measurements and L3 intra-frequency and inter-frequency/inter-RAT measurements according to one or more implementations described herein.

FIG. 5 is a diagram of an example 500 of a shared measurement gap divided between L1 serving and non-serving cell measurements and L3 measurements intra-frequency and inter-frequency/inter-RAT measurements according to one or more implementations described herein. Example 500 is provided as a representative, but non-limiting, example of the example of FIG. 4. As shown, X1 and X2 are each equal to 50% of a shared measurement gap. Y1 and Y2 are equal to 25% and 75% of X1, respectively. Z1 and Z2 are each equal to 50% of X2, respectively. As such, of the eight measurement instances or gaps of example 500, four are L1 signal measurement gaps (X1) and four are L3 signal measurement gaps (X2). Of the four L1 measurements gaps (X1), one is allocated to serving cell measurements because Y1 is equal to 25%, and three are allocated to non-serving cell measurements because Y2 is equal to 75%. Of the four L1 measurement gaps (X2), two are allocated to intra-frequency measurements and two are allocated to inter-frequency/inter-RAT measurements because Z1 and Z2 are each equal to 50%. Additionally, while example 500 includes an interchanging sequence X1 and X2 gaps, in some implementations, this pattern or sequence may be different.

FIG. 6 is a diagram of an example 600 for measurement gap sharing between L1 and L3 intra-frequency and inter-frequency/inter-RAT measurements according to one or more implementations described herein. Example 600 may represent possible configurations that base station 222 may provide to UE 210 for measurement gap sharing. Variables X1 and X2 may correspond to intra-frequency signal measurements and inter-frequency/inter-RAT signal measurements, respectively. Together, X1 and X2 may represent 100% (e.g., an entirety) of a shared measurement gap, with X1 and X2 representing 50% each. X1 may comprise variables Y1 and Y2. Y1 may represent a portion of X1 allocated to L1 measurements (e.g., measurements of intra-frequency L1 signals). Y2 may represent a portion of X1 allocated to L3 measurements (e.g., measurements of intra-frequency L3 signals). Thus, Y1 plus Y2 may equal X1.

X2 may comprise variables Z1 and Z2. Z1 may represent a portion of X2 allocated to L1 measurements (e.g., measurements of inter-frequency/inter-RAT L1 signals). Z2 may represent a portion of X2 allocated to L3 measurements (e.g., measurements of inter-frequency/inter-RAT L3 signals). Thus, Z1 plus Z2 may equal X2. In some implementations, the values of X1, X2, Y1, Y2, Z1, and Z2 may vary. For example, X1 may be 25% and X2 may be 75% of the shared measurement gap. Similarly, Y1 and Y2 may, or may not, be 50% of the amount of the shared measurement gap allocated to X1, and Z1 and Z2 may, or may not, 50% of the amount of the shared measurement gap allocated to Z1 and Z2.

Figure 7:
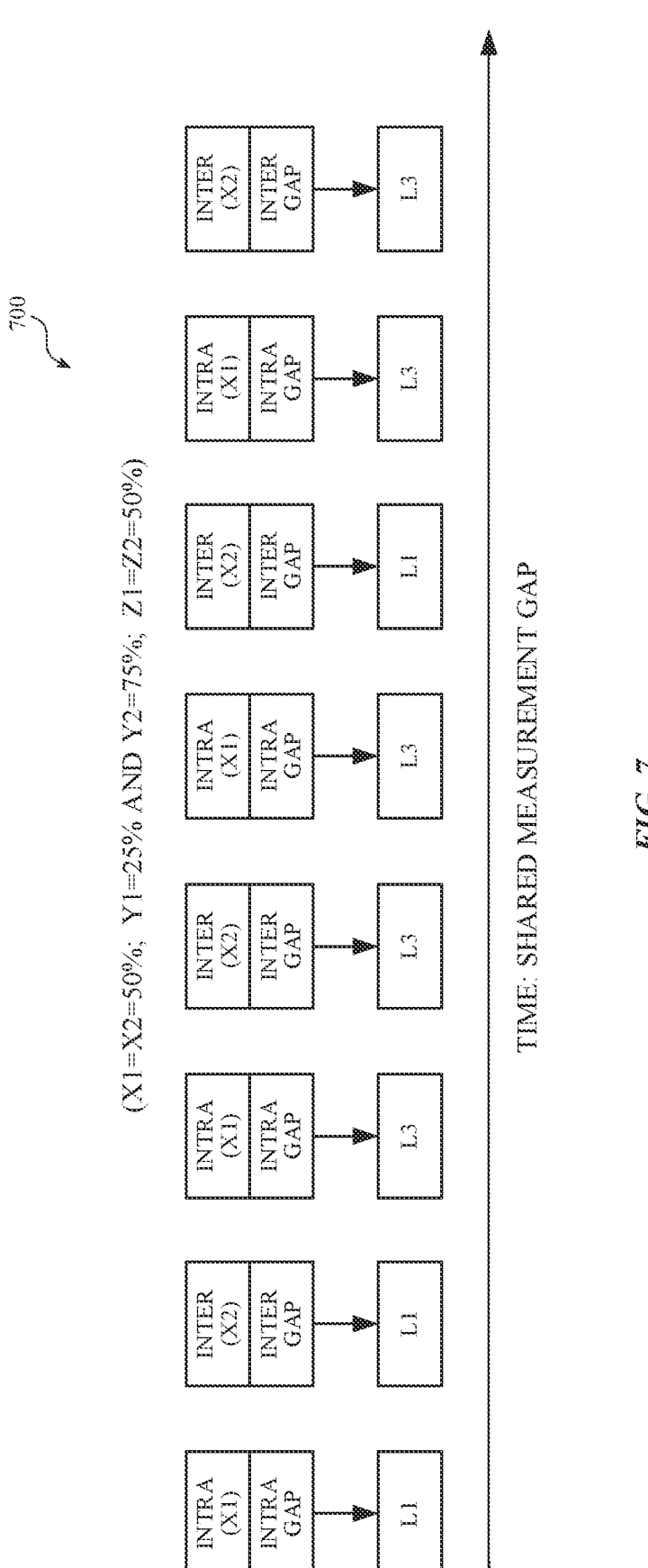
FIG. 7 is a diagram of an example of a measurement gap divided between L1 and L3 intra-frequency and inter-frequency/inter-RAT measurements according to one or more implementations described herein.

FIG. 7 is a diagram of an example 700 of a measurement gap divided between L1 and L3 intra-frequency and inter-frequency/inter-RAT measurements according to one or more implementations described herein. Example 700 is provided as a representative, but non-limiting, example of the example of FIG. 6. As shown, X1 and X2 are each equal to 50% of a shared measurement gap. Y1 and Y2 are equal to 25% and 75% of X1, respectively. Z1 and Z2 are each equal to 50% of X2, respectively. As such, of the eight measurement instances or gaps of example 700, four are intra-frequency signal measurement gaps (X1) and four are inter-frequency/inter-RAT signal measurement gaps (X2). Of the four intra-frequency signal measurement gaps (X1), one is allocated to L1 measurements because Y1 is equal to 25%, and three are allocated to L3 measurements because Y2 is equal to 75%. Of the four inter-frequency/inter-RAT signal measurement gaps (X2), two are allocated to L1 measurements and two are allocated to L3 measurements because Z1 and Z2 are each equal to 50%. Additionally, while example 500 includes an interchanging sequence X1 and X2 gaps, in some implementations, this pattern or sequence may be different.

Figure 8:
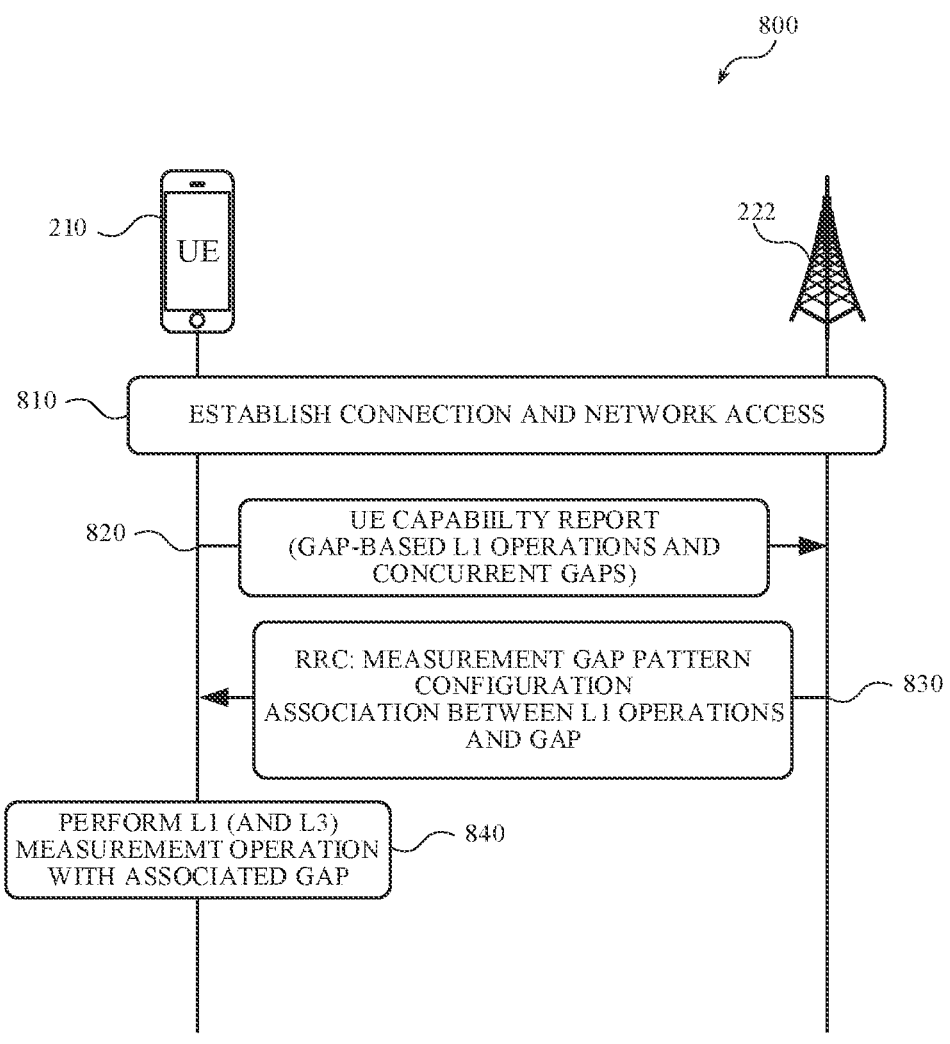
FIG. 8 is a diagram of an example process for configuring a user equipment (UE) to use a measurement gap, of a pattern of measurement gaps, for L1 operations and measurements according to one or more implementations described herein.

FIG. 8 is a diagram of an example process 800 for configuring UE 210 to use a measurement gap, of a pattern of measurement gaps, for L1 operations and measurements according to one or more implementations described herein. Process 800 may be implemented by UE 210 and base station 222. In some implementations, some or all of process 800 may be performed by one or more other systems or devices, including one or more of the devices of FIG. 2, such as a non-serving base station (not shown). Additionally, process 800 may include one or more fewer, additional, differently ordered and/or arranged operations than those shown in FIG. 8. In some implementations, some or all of the operations of process 800 may be performed independently, successively, simultaneously, etc., of one or more of the other operations of process 800. As such, the techniques described herein are not limited to a number, sequence, arrangement, timing, etc., of the operations or process depicted in FIG. 8.

UE 210 may communicate with base station 222, to establish a connection and network access via base station 222 (block 810). UE 210 may communicate a UE capability report to base station 222 (block 820). The UE capability report may include information about the communication capabilities of UE 210, including an indication of UE 210 being able to support L1 operations and concurrent gaps. Examples of L1 operations may include RLM, BFD, CBD, L1-RSRP, and L1-SINR measurements. An example of concurrent use of gaps may be an indication that UE 210 may use one or more measurement gaps, of a measurement gap pattern, to perform one or more L1 operation and corresponding measurement during a corresponding measurement gap.

Base station 222 may determine a measurement gap pattern configuration based on the UE capability report and provide the measurement gap pattern configuration to UE 210 (block 830). The measurement gap pattern configuration may include one or more measurement gap patterns and an indication of one or more of the measurement gaps, in one or more of the measurement gap patterns, being designated for L1 measurement operations and/or L1 and L3 measurement operations. In some implementations, the indicate that one or more of the measurement gap patterns is allocated to L1 measurement operations (and/or L1 and L3 measurement operations) may cause UE 210 to assume that all measurement gaps are associated with L3 measurement operations. In some implementations, measurement gaps allocated to L3 measurement operations may be explicitly indicated by base station 222. After receiving the measurement gap pattern configuration, UE 210 may perform L1 (and L3) measurement operations with associated measurement gaps (block 840).

Figure 9:
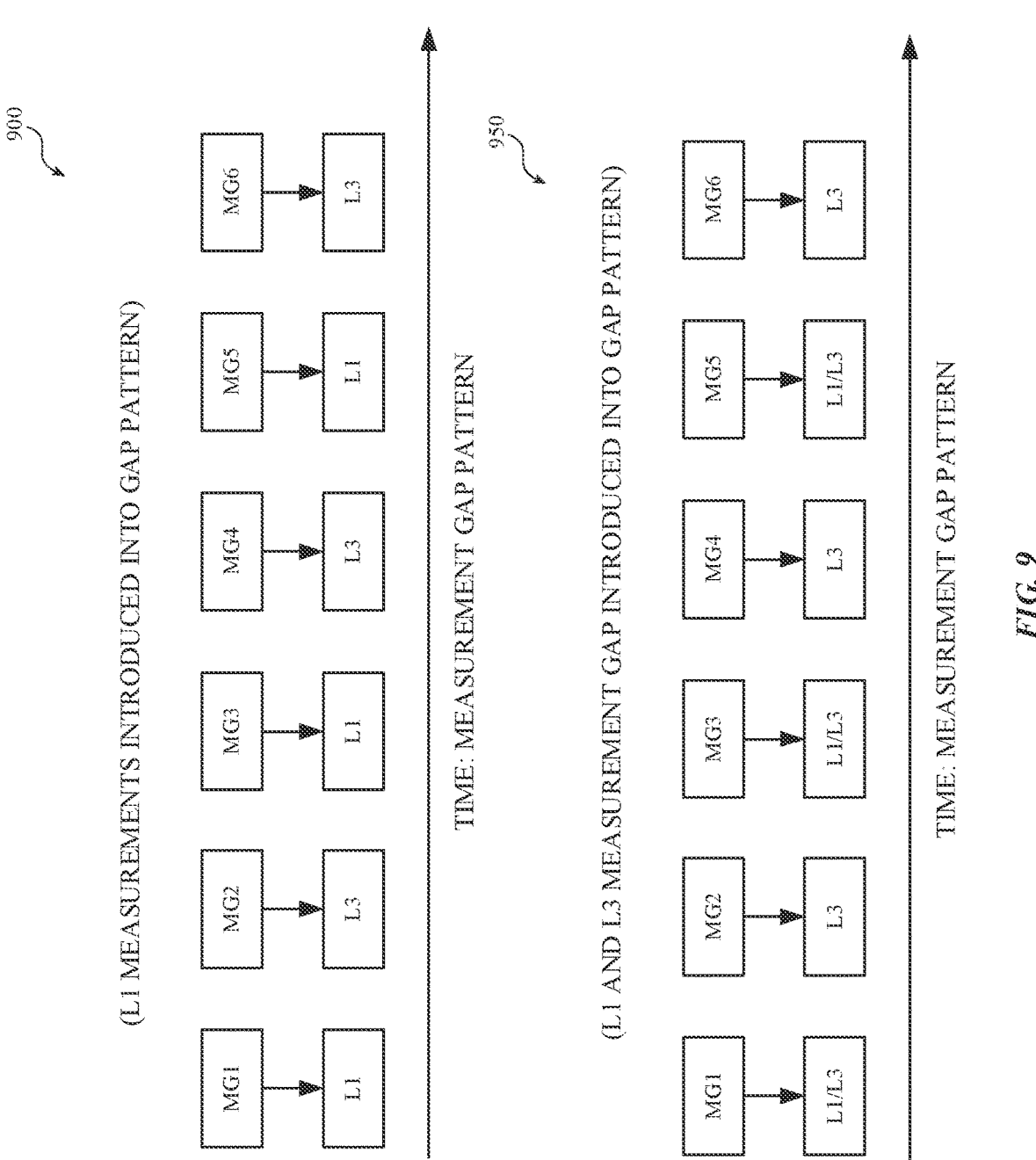
FIG. 9 is a diagram of example measurement gap patterns and according to one or more implementations described herein.

FIG. 9 is a diagram of example measurement gap patterns 900 and 950 according to one or more implementations described herein. As shown, measurement gap patterns 900 and 950 may include multiple measurement gaps (MG1, MG2, MG6). Base station 222 may configure UE 210 to use a measurement gap pattern that includes multiple measurement gaps. Base station 222 may configure UE 210 with measurement gap patterns 900 and/or 950. For example, base station 222 may indicate which measurement pages, of a measurement gap pattern, are allocated to L1 operations (e.g., MG1, MG3, and MG5), as shown in measurement gap pattern 900. In such implementations, UE 210 may assume that the remainder of the measurement gaps are allocated to L3 operations. Referring to measurement gap pattern 950, base station 222 may also, or alternatively, may indicate which measurement pages, of a measurement gap pattern, are shared measurement gaps for L1 and L3 measurements (e.g., MG1, MG3, and MG5). In such implementations, UE 210 may assume that the remainder of the measurement gaps are allocated to L3 operations.

FIG. 10 is a diagram of an example 1000 of an enhanced RRC message and/or IE for associating L1 measurements a measurement gap of a measurement gap pattern according to one or more implementations described herein. Base station 222 may communicate the RRC message to UE 210 as part of a the gap measurement configuration information sent to UE 210. As shown, example 1000 may include a GapConfig IE that includes a variety of attributes, such as measGapId, preConfiggInd, etc. The GapConfig IE also include L1MeasurementFlag, which may be enumerated as either true or false. When indicated as true, L1MeasurementFlag may configure UE 210 to use the corresponding measurement gap for both L1 and L3 measurements. Examples of L1 measurements may include RLM, BFD, CBD, L1-RSRP, and L1-SINR measurements. In some implementations, the enhanced RRC message and/or IE of example 1000 may also be used to indicate which measurement pages, of a measurement gap pattern, are shared measurement gaps for L1 and L3 measurements. In some implementations, and additional or alternative, RRC message and/or IE may be used.

FIG. 11 is a diagram of an example 1100 for allocating L1 operations among measurement gaps according to one or more implementations described herein. As described above, one or more measurement gaps, of a measurement gap pattern, may be allocated to L1 operations measurements and/or a combination of L1 and L3 operation measurements. Base station 222 may send UE 210 an RRC message that includes measurement gap pattern configuration information. For measurement gaps allocated to either L1 operation measurements and/or L1 and L3 operation measurements, base station 222 may also indicate a portion or percentage of the corresponding measuring gap that is allocated to RLM, BFD, CBD, L1-RSRP, and/or L1-SINR measurements. In some implementations, this may be done via a measGapSharingSchemeL1 IE and/or one or more other types of RRC IEs.

As shown, measGapSharingSchemeL1 IE may include one or more L1 operations measurements and a corresponding value (e.g., X, Y, and Z) representing a percentage of a corresponding measuring gap. Additionally, the values of X, Y, and Z may add up to 100% of the corresponding measurement gap space for L1 operation measurement. In scenarios implementing the measurement gap sharing schemes described above with reference to FIGS. 6-8, the percentage may be a portion or subset percentage of the corresponding among allocated for L1 operations in general. Additionally, UE 210 may determine which measurement gap sharing scheme is to be applied when MeasGapSharingSchemeL1 is absent and/or there is no stored value in the field.

Figure 12:
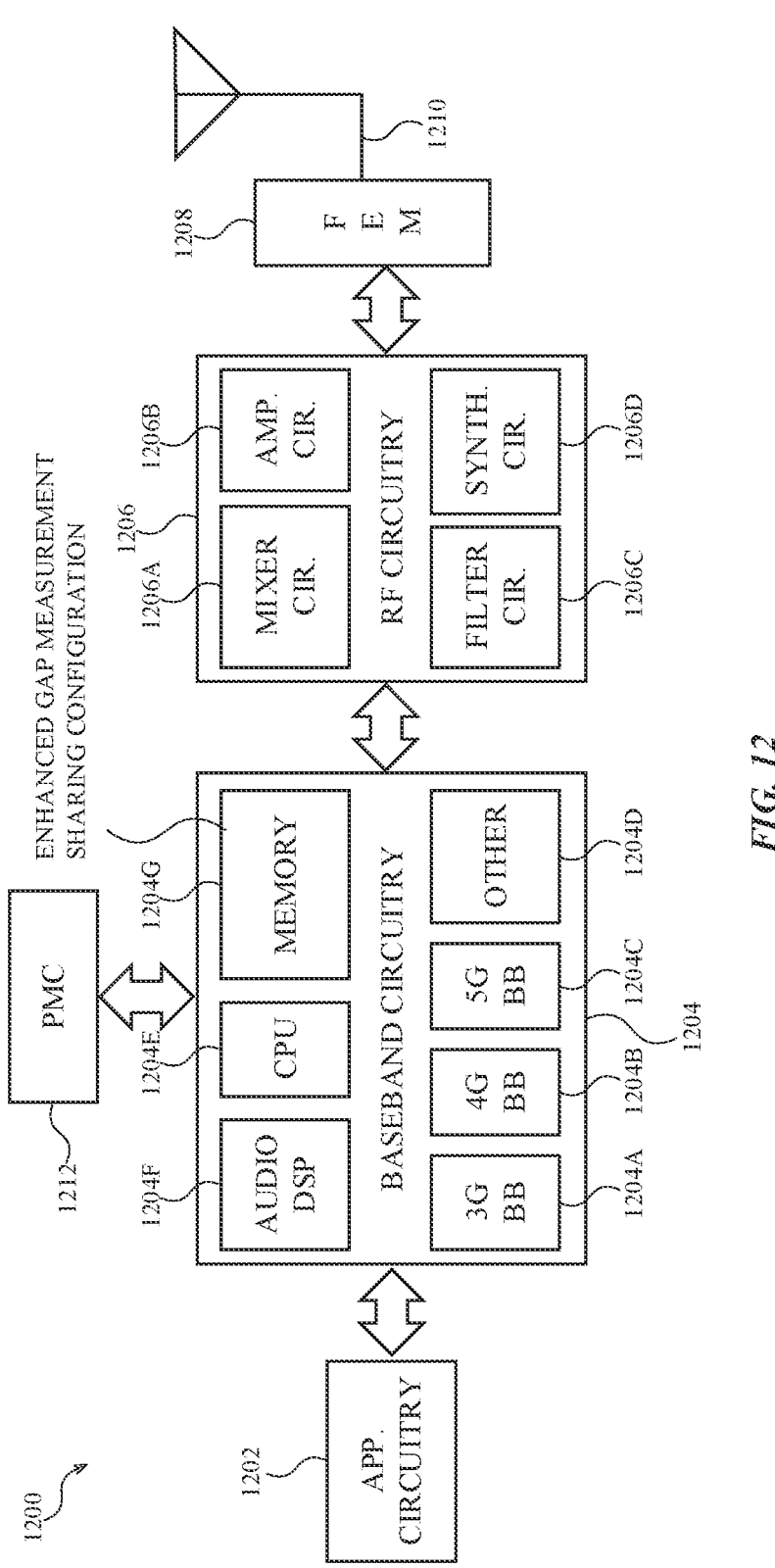
FIG. 12 is a diagram of an example of components of a device according to one or more implementations described herein.

FIG. 12 is a diagram of an example of components of a device according to one or more implementations described herein. In some implementations, the device 1200 can include application circuitry 1202, baseband circuitry 1204, RF circuitry 1206, front-end module (FEM) circuitry 1208, one or more antennas 1210, and power management circuitry (PMC) 1212 coupled together at least as shown. The components of the illustrated device 1200 can be included in a UE or a RAN node. In some implementations, the device 1200 can include fewer elements (e.g., a RAN node may not utilize application circuitry 1202, and instead include a processor/controller to process IP data received from a CN or an Evolved Packet Core (EPC)). In some implementations, the device 1200 can include additional elements such as, for example, memory/storage, display, camera, sensor (including one or more temperature sensors, such as a single temperature sensor, a plurality of temperature sensors at different locations in device 1200, etc.), or input/output (I/O) interface. In other implementations, the components described below can be included in more than one device (e.g., said circuitries can be separately included in more than one device for Cloud-RAN (C-RAN) implementations).

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1200. In some implementations, processors of application circuitry 1202 can process IP data packets received from an EPC.

The baseband circuitry 1204 can include circuitry such as, but not limited to, one or more single-core or multi-core processors. The baseband circuitry 1204 can include one or more baseband processors or control logic to process baseband signals received from a receive signal path of the RF circuitry 1206 and to generate baseband signals for a transmit signal path of the RF circuitry 1206. Baseband circuitry 1204 can interface with the application circuitry 1202 for generation and processing of the baseband signals and for controlling operations of the RF circuitry 1206. For example, in some implementations, the baseband circuitry 1204 can include a 3G baseband processor 1204A, a 4G baseband processor 1204B, a 5G baseband processor 1204C, or other baseband processor(s) 1204D for other existing generations, generations in development or to be developed in the future (e.g., 5G, 6G, etc.). The baseband circuitry 1204 (e.g., one or more of baseband processors 1204A-D) can handle various radio control functions that enable communication with one or more radio networks via the RF circuitry 1206. In other implementations, some or all of the functionality of baseband processors 1204A-D can be included in modules stored in the memory 1204G and executed via a Central Processing Unit (CPU) 1204E. The radio control functions can include, but are not limited to, signal modulation/demodulation, encoding/decoding, radio frequency shifting, etc. In some implementations, modulation/demodulation circuitry of the baseband circuitry 1204 can include Fast-Fourier Transform (FFT), precoding, or constellation mapping/de-mapping functionality. In some implementations, encoding/decoding circuitry of the baseband circuitry 1204 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1204G may receive and store an enhanced measurement gap sharing configuration from RAN node 222. The measurement gap sharing configuration may enable UE 110 to share a measurement gap to take L1 serving cell measurements, L1 non-serving cell measurements, and L3 intra-frequency and inter-frequency/inter-RAT measurements. Additionally, or alternatively, the measurement gap sharing configuration may enable UE 110 to share a measurement gap to take intra-frequency L1 and L3 measurements, and inter-frequency/inter-RAT L1 and L3 measurements. The measurement gap sharing configuration may further enable UE 110 to implement a measurement gap pattern for L1 and L3 measurements and allocate L1 portions of a shared measurement gap among specific types of L1 operations (e.g., RLM, BFD, etc.).

In some implementations, the baseband circuitry 1204 can include one or more audio digital signal processor(s) (DSP) 1204F. The audio DSPs 1204F can include elements for compression/decompression and echo cancellation and can include other suitable processing elements in other implementations. Components of the baseband circuitry can be suitably combined in a single chip, a single chipset, or disposed on a same circuit board in some implementations.

In some implementations, some or all of the constituent components of the baseband circuitry 1204 and the application circuitry 1202 can be implemented together such as, for example, on a system on a chip (SOC).

In some implementations, the baseband circuitry 1204 can provide for communication compatible with one or more radio technologies. For example, in some implementations, the baseband circuitry 1204 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various implementations, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some implementations, the receive signal path of the RF circuitry 1206 can include mixer circuitry 1206A, amplifier circuitry 1206B and filter circuitry 1206C. In some implementations, the transmit signal path of the RF circuitry 1206 can include filter circuitry 1206C and mixer circuitry 1206A. RF circuitry 1206 can also include synthesizer circuitry 1206D for synthesizing a frequency for use by the mixer circuitry 1206A of the receive signal path and the transmit signal path. In some implementations, the mixer circuitry 1206A of the receive signal path can be configured to down-convert RF signals received from the FEM circuitry 1208 based on the synthesized frequency provided by synthesizer circuitry 1206D. The amplifier circuitry 1206B can be configured to amplify the down-converted signals and the filter circuitry 1206C can be a low-pass filter (LPF) or band-pass filter (BPF) configured to remove unwanted signals from the down-converted signals to generate output baseband signals. Output baseband signals can be provided to the baseband circuitry 1204 for further processing. In some implementations, the output baseband signals can be zero-frequency baseband signals, although this is not a requirement. In some implementations, mixer circuitry 1206A of the receive signal path can comprise passive mixers, although the scope of the implementations is not limited in this respect.

In some implementations, the mixer circuitry 1206A of the transmit signal path can be configured to up-convert input baseband signals based on the synthesized frequency provided by the synthesizer circuitry 1206D to generate RF output signals for the FEM circuitry 1208. The baseband signals can be provided by the baseband circuitry 1204 and can be filtered by filter circuitry 1206C.

In some implementations, the mixer circuitry 1206A of the receive signal path and the mixer circuitry 1206A of the transmit signal path can include two or more mixers and can be arranged for quadrature down conversion and up conversion, respectively. In some implementations, the mixer circuitry 1206A of the receive signal path and the mixer circuitry 1206A of the transmit signal path can include two or more mixers and can be arranged for image rejection (e.g., Hartley image rejection). In some implementations, the mixer circuitry 1206A of the receive signal path and the mixer circuitry 1406A can be arranged for direct down conversion and direct up conversion, respectively. In some implementations, the mixer circuitry 1206A of the receive signal path and the mixer circuitry 1206A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode implementations, a separate radio IC circuitry can be provided for processing signals for each spectrum, although the scope of the implementations is not limited in this respect.

In some implementations, the synthesizer circuitry 1206D can be a fractional-N synthesizer or a fractional N/N+1 synthesizer, although the scope of the implementations is not limited in this respect as other types of frequency synthesizers can be suitable. For example, synthesizer circuitry 1206D can be a delta-sigma synthesizer, a frequency multiplier, or a synthesizer comprising a phase-locked loop with a frequency divider.

The synthesizer circuitry 1206D can be configured to synthesize an output frequency for use by the mixer circuitry 1206A of the RF circuitry 1206 based on a frequency input and a divider control input. In some implementations, the synthesizer circuitry 1206D can be a fractional N/N+1 synthesizer.

In some implementations, frequency input can be provided by a voltage-controlled oscillator (VCO), although that is not a requirement. Divider control input can be provided by either the baseband circuitry 1204 or the applications circuitry 1202 depending on the desired output frequency. In some implementations, a divider control input (e.g., N) can be determined from a look-up table based on a channel indicated by the applications circuitry 1202.

Synthesizer circuitry 1206D of the RF circuitry 1206 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1206D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210. In various implementations, the amplification through the transmit or receive signal paths can be done solely in the RF circuitry 1206, solely in the FEM circuitry 1208, or in both the RF circuitry 1206 and the FEM circuitry 1208.

In some implementations, the FEM circuitry 1208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210).

In some implementations, the PMC 1212 can manage power provided to the baseband circuitry 1204. In particular, the PMC 1212 can control power-source selection, voltage scaling, battery charging, or DC-to-DC conversion. The PMC 1212 can often be included when the device 1200 is capable of being powered by a battery, for example, when the device is included in a UE. The PMC 1212 can increase the power conversion efficiency while providing desirable implementation size and heat dissipation characteristics.

While FIG. 12 shows the PMC 1212 coupled only with the baseband circuitry 1204. However, in other implementations, the PMC 1212 may be additionally or alternatively coupled with, and perform similar power management operations for, other components such as, but not limited to, application circuitry 1202, RF circuitry 1206, or FEM circuitry 1208.

In some implementations, the PMC 1212 can control, or otherwise be part of, various power saving mechanisms of the device 1200. For example, if the device 1200 is in an RRC_Connected state, where it is still connected to the RAN node as it expects to receive traffic shortly, then it can enter a state known as Discontinuous Reception Mode (DRX) after a period of inactivity. During this state, the device 1200 can power down for brief intervals of time and thus save power.

If there is no data traffic activity for an extended period of time, then the device 1200 can transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1202 and processors of the baseband circuitry 1204 can be used to execute elements of one or more instances of a protocol stack. For example, processors of the baseband circuitry 1204, alone or in combination, can be used execute Layer 3, Layer 2, or Layer 1 functionality, while processors of the baseband circuitry 1204 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 13:
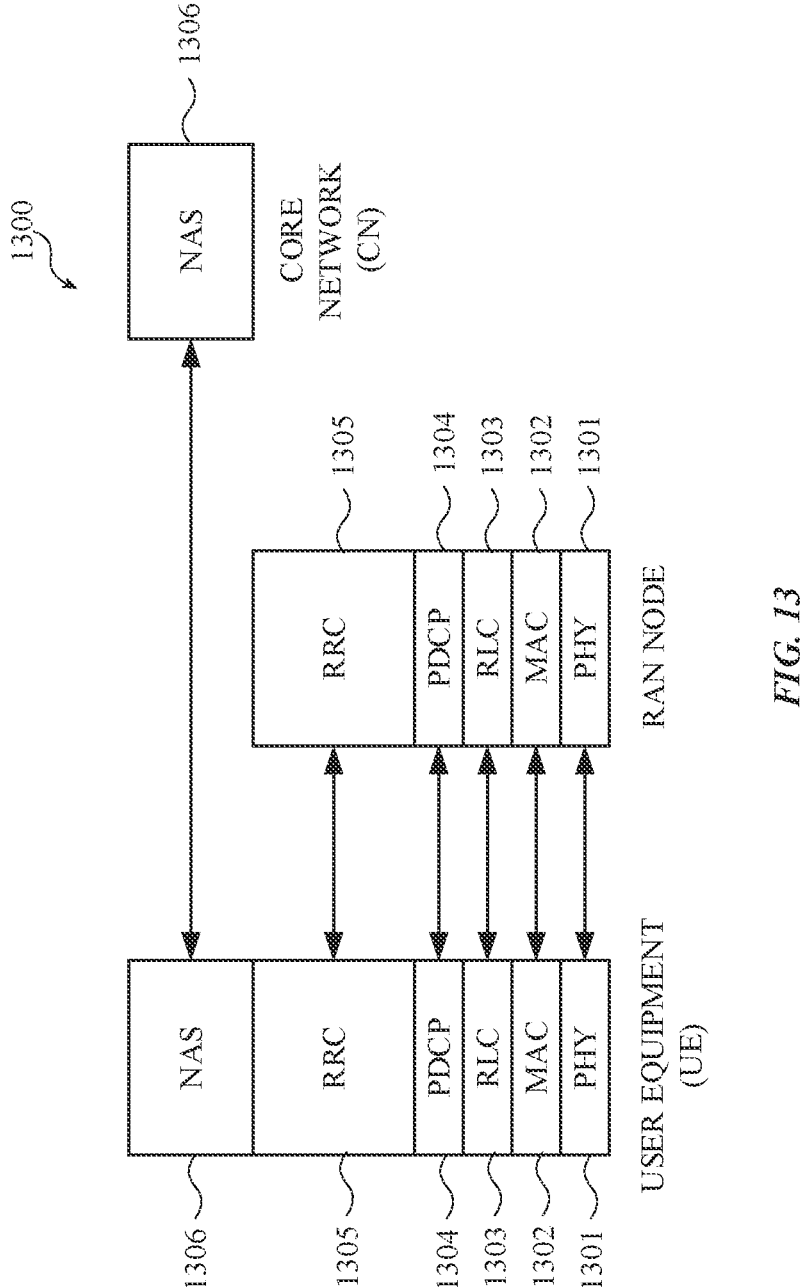
FIG. 13 is a diagram of an example of control plane protocol stack in accordance with one or more implementations described herein.

FIG. 13 is a diagram of an example of control plane protocol stack in accordance with one or more implementations described herein. In this implementation, a control plane 1300 is shown as a communications protocol stack between network devices or entities.

The PHY layer 1301 may transmit or receive information used by the MAC layer 1302 over one or more air interfaces. The PHY layer 1301 may further perform link adaptation or adaptive modulation and coding (AMC), power control, cell search (e.g., for initial synchronization and handover purposes), and other measurements used by higher layers, such as the RRC layer 1305. The PHY layer 1301 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1302 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TB s, scheduling information reporting, error correction through hybrid automatic repeat request (HARQ), and logical channel prioritization.

The RLC layer 1303 may operate in a plurality of modes of operation, including: Transparent Mode (TM), Unacknowledged Mode (UM), and/or Acknowledged Mode (AM). The RLC layer 1303 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1303 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1304 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1305 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. MIBs and SIBs may comprise one or more information elements (IEs), which may each comprise individual data fields or data structures.

The UE and the RAN node may utilize a Uu interface (e.g., an NR interface) to exchange control plane data via a protocol stack comprising the PHY layer 1301, the MAC layer 1302, the RLC layer 1303, the PDCP layer 1304, and the RRC layer 1305.

The non-access stratum (NAS) protocols 1306 form the highest stratum of the control plane between the UE and the Core Network (CN). The NAS protocols 1306 may support the mobility of the UE and the session management procedures to establish and maintain IP connectivity between the UE and the network.

Figure 14:
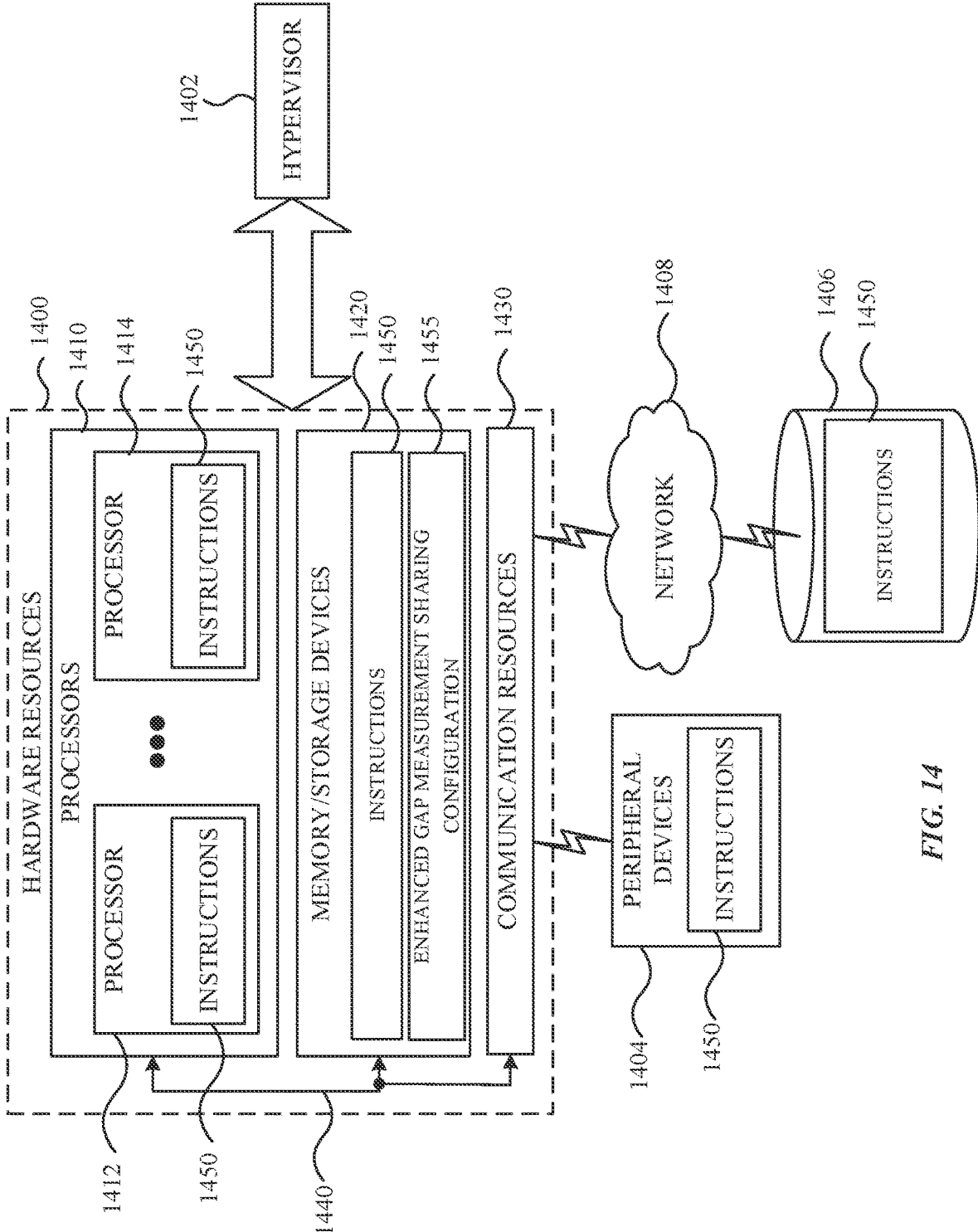
FIG. 14 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 14 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For implementations where node virtualization (e.g., NFV) is utilized, a hypervisor 1402 may be executed to provide an execution environment for one or more network slices/sub-slices to utilize the hardware resources 1400

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1420 may receive and store an enhanced measurement gap sharing configuration 1455 from RAN node 222. The measurement gap sharing configuration may enable UE 210 to share a measurement gap to take L1 serving cell measurements, L1 non-serving cell measurements, and L3 intra-frequency and inter-frequency/inter-RAT measurements. Additionally, or alternatively, the measurement gap sharing configuration may enable UE 210 to share a measurement gap to take intra-frequency L1 and L3 measurements, and inter-frequency/inter-RAT L1 and L3 measurements. The measurement gap sharing configuration may further enable UE 210 to implement a measurement gap pattern for L1 and L3 measurements and allocate L1 portions of a shared measurement gap among specific types of L1 operations (e.g., RLM, BFD, etc.).

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the example described herein, a user equipment (UE) may comprise: a memory; and one or more processors configured to, when executing instructions stored in the memory, cause the UE to: receive a measurement gap configuration from a base station, the measurement gap configuration comprising a shared measurement gap for measurements regarding one or more layer 1 (L1) operations and one or more layer 3 (L3) operations; measure, in accordance with the measurement gap configuration and during the shared measurement gap, signals corresponding to the one or more L1 operations and the one or more L3 operations; and communicate, to the base station, a measurement report based on measurements of the one or more L1 operations and the one or more L3 operations.

In example 2, which may also include one or more of the example described herein, wherein the measurement gap configuration comprises an indication of a portion of the shared measurement gap allocated to measurement of the one or more L1 operations and a portion of the shared measurement gap allocated to measurement of the one or more L3 operations.

In example 3, which may also include one or more of the example described herein, wherein the indication comprises an entirety of the shared measurement gap.

In example 4, which may also include one or more of the example described herein, wherein the portion of the shared measurement gap allocated to measurement of the one or more L1 operations comprises a portion allocated to a serving cell and a portion allocated to a non-serving cell.

In example 5, which may also include one or more of the example described herein, wherein the portion allocated to the serving cell and the portion allocated to the non-serving cell comprise an entirety of the portion of the shared measurement gap allocated to measurement of the one or more L1 operations.

In example 6, which may also include one or more of the example described herein, wherein the portion of the shared measurement gap allocated to measurement of the one or more L3 operations comprises a portion allocated to intra-frequency measurements and a portion allocated to inter-frequency/inter-RAT measurements.

In example 7, which may also include one or more of the example described herein, wherein the portion allocated to intra-frequency measurements and the portion allocated to inter-frequency/inter-RAT measurements comprise an entirety of the shared measurement gap allocated to measurement of the one or more L1 operations.

In example 8, which may also include one or more of the example described herein, wherein the measurement gap configuration comprises an indication of a portion of the shared measurement gap allocated to intra-frequency measurements and a portion of the shared measurement gap allocated to inter-frequency/inter-RAT measurements.

In example 9, which may also include one or more of the example described herein, wherein the indication comprises an entirety of the shared measurement gap.

In example 10, which may also include one or more of the example described herein, wherein the portion of the shared measurement gap allocated to intra-frequency measurements comprises an L1 operations measurements portion and an L3 operations measurements portion. In example 11, which may also include one or more of the example described herein, wherein the portion of the shared measurement gap allocated to inter-frequency/inter-RAT measurements comprises an L1 operations measurements portion and an L3 operations measurements portion.

In example 12, which may also include one or more of the example described herein, wherein the one or more L1 operations comprise at least one of: radio link monitoring (RLM), beam failure discovery (BFD), candidate beam discovery (CBD), layer 1 reference signal received power (L1-RSRP) measurement, or layer 1 signal-to-interference-plus-noise ratio (L1-SINR) measurement.

In example 13, which may also include one or more of the example described herein, wherein the one or more L1 operations comprise a plurality of L1 operations, and the measurement gap configuration indicates a portion of the shared measurement gap allocated to each L1 operation of the plurality of L1 operations.

In example 14, which may also include one or more of the example described herein, a user equipment (UE) may comprise: a memory; and one or more processors configured to, when executing instructions stored in the memory, cause the UE to: receive, from a base station, a measurement gap configuration comprising a measurement gap pattern including a plurality of measurement gaps for measuring one or more layer 1 (L1) operations and one or more layer 3 (L3) operations; measure, in accordance with the measurement gap pattern, the one or more L1 operations and the one or more L3 operations; and communicate, to the base station, a measurement report based on measurements of the one or more L1 operations and the one or more L3 operations.

In example 15, which may also include one or more of the example described herein, wherein the measurement gap pattern indicates which measurement gaps, of the plurality of measurement gaps, are allocated to measuring L1 operations and which measurement gaps, of the plurality of measurement gaps, are allocated to measuring L3 operations.

In example 16, which may also include one or more of the example described herein, wherein at least one measurement gap, of the measurement gap pattern, is allocated to measuring L1 operations and L3 operations.

In example 17, which may also include one or more of the example described herein, wherein the measurement gap pattern is received via a radio resource control (RRC) message comprising an information element (IE) with an L1MeasurementFlag value.

In example 18, which may also include one or more of the example described herein, wherein the measurement gap configuration comprising a shared measurement gap for measurements regarding L1 operations and L3 operations within the shared measurement gap.

In example 19, which may also include one or more of the example described herein, wherein the one or more L1 operations comprise at least one of: radio link monitoring (RLM), beam failure discovery (BFD), candidate beam discovery (CBD), layer 1 reference signal received power (L1-RSRP) measurement, or layer 1 signal-to-interference-plus-noise ratio (L1-SINR) measurement.

In example 20, which may also include one or more of the example described herein, wherein the one or more L1 operations comprise a plurality of L1 operations, and the measurement gap configuration indicates a portion of the shared measurement gap allocated to each L1 operation of the plurality of L1 operations.

In example 21, which may also include one or more of the example described herein, wherein the measurement gap configuration is received via a radio resource control (RRC) message.

In example 22, which may also include one or more of the example described herein, a method, performed by a user equipment (UE), the method comprising: receiving, from a base station, a measurement gap configuration comprising a measurement gap pattern including a plurality of measurement gaps for measuring one or more layer 1 (L1) operations and one or more layer 3 (L3) operations; measuring, in accordance with the measurement gap pattern, the one or more L1 operations and the one or more L3 operations; and communicating, to the base station, a measurement report based on measurements of the one or more L1 operations and the one or more L3 operations.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. A user equipment (UE), comprising:

a memory; and one or more processors configured to, when executing instructions stored in the memory, cause the UE to:

receive a measurement gap configuration from a base station, the measurement gap configuration comprising a shared measurement gap for measurements corresponding to a layer 1 (L1) operation and a layer 3 (L3) operation;

measure, in accordance with the measurement gap configuration and during the shared measurement gap, a first signal corresponding to the L1 operation and a second signal corresponding to the L3 operation; and communicate, to the base station, a measurement report based on measurements of the first signal and the second signal.

2. The UE of claim 1, wherein the measurement gap configuration comprises an indication of a portion of the shared measurement gap allocated to measurement of the L1 operation and a portion of the shared measurement gap allocated to measurement of the L3 operation.

3. The UE of claim 2, wherein the indication comprises an entirety of the shared measurement gap.

4. The UE of claim 2, wherein the portion of the shared measurement gap allocated to measurement of the L1 operation comprises a portion allocated to a serving cell and a portion allocated to a non-serving cell.

5. The UE of claim 4, wherein the portion allocated to the serving cell and the portion allocated to the non-serving cell comprise an entirety of the portion of the shared measurement gap allocated to measurement of the L1 operation.

6. The UE of claim 4, wherein the portion of the shared measurement gap allocated to measurement of the L3 operation comprises a portion allocated to intra-frequency measurements and a portion allocated to inter-frequency/inter-RAT measurements.

7. The UE of claim 6, wherein the portion allocated to intra-frequency measurements and the portion allocated to inter-frequency/inter-RAT measurements comprise an entirety of the shared measurement gap allocated to measurement of the L1 operation.

8. The UE of claim 1, wherein the measurement gap configuration comprises an indication of a portion of the shared measurement gap allocated to intra-frequency measurements and a portion of the shared measurement gap allocated to inter-frequency/inter-RAT measurements.

9. The UE of claim 8, wherein the indication comprises an entirety of the shared measurement gap.

10. The UE of claim 8, wherein the portion of the shared measurement gap allocated to intra-frequency measurements comprises an L1 operations measurements portion and an L3 operations measurements portion.

11. The UE of claim 8, wherein the portion of the shared measurement gap allocated to inter-frequency/inter-RAT measurements comprises an L1 operations measurements portion and an L3 operations measurements portion.

12. The UE of claim 1, wherein the L1 operation comprises at least one of:

radio link monitoring (RLM),
beam failure discovery (BFD),
candidate beam discovery (CBD),
layer 1 reference signal received power (L1-RSRP) measurement, or layer 1 signal-to-interference-plus-noise ratio (L1-SINR) measurement.

13. The UE of claim 12, wherein the L1 operation comprises a plurality of L1 operations, and the measurement gap configuration indicates a portion of the shared measurement gap allocated to each L1 operation of the plurality of L1 operations.

14. A user equipment (UE), comprising:

a memory; and one or more processors configured to, when executing instructions stored in the memory, cause the UE to:

receive, from a base station, a measurement gap configuration comprising a measurement gap pattern including a plurality of measurement gaps for measuring a layer 1 (L1) operation and a layer 3 (L3) operation;

measure, in accordance with the measurement gap pattern, the L1 operation and the L3 operation; and communicate, to the base station, a measurement report based on measurements of the L1 operation and the L3 operation.

15. The UE of claim 14, wherein the measurement gap pattern indicates a first group of measurement gaps of the plurality of measurement gaps allocated to measuring L1 operations and a second group of measurement gaps of the plurality of measurement gaps allocated to measuring L3 operations.

16. The UE of claim 14, wherein at least one measurement gap, of the measurement gap pattern, is allocated to measuring L1 operations and L3 operations.

17. The UE of claim 14, wherein the measurement gap pattern is received via a radio resource control (RRC) message comprising an information element (IE) with an L1MeasurementFlag value.

18. The UE of claim 14, wherein the measurement gap configuration comprising a shared measurement gap for measurements regarding L1 operations and L3 operations within the shared measurement gap.

19. The UE of claim 14, wherein the L1 operation comprises at least one of:

radio link monitoring (RLM),
beam failure discovery (BFD),
candidate beam discovery (CBD),
layer 1 reference signal received power (L1-RSRP) measurement, or
layer 1 signal-to-interference-plus-noise ratio (L1-SINR) measurement.

20. A method, performed by a user equipment (UE), comprising:

receiving, from a base station, a measurement gap configuration comprising a measurement gap pattern including a plurality of measurement gaps for measuring a layer 1 (L1) operation and a layer 3 (L3) operation;

measuring, in accordance with the measurement gap pattern, the L1 operation and the L3 operation; and communicating, to the base station, a measurement report based on measurements of the L1 operation and the L3 operation.

* * * * *